United States Patent
Soule, Jr. et al.

[11] B 3,982,245
[45] Sept. 21, 1976

[54] SIDELOBE CANCELLER WITH PROGRAMMABLE CORRELATION SIGNAL WEIGHTING

[75] Inventors: Hendrick H. Soule, Jr., Marcellus; John F. Jureller, Syracuse, both of N.Y.

[73] Assignee: General Electric Company, Syracuse, N.Y.

[22] Filed: July 15, 1974

[21] Appl. No.: 488,395

[44] Published under the second Trial Voluntary Protest Program on January 27, 1976 as document No. B 488,395.

[52] U.S. Cl. ................ 343/100 LE; 343/100 CL
[51] Int. Cl.² ................................ G01S 3/06
[58] Field of Search ............ 343/100 LE, 100 CL

[56] References Cited
UNITED STATES PATENTS
3,202,990  8/1965  Howells ................ 343/100 CL

*Primary Examiner*—T. H. Tubbesing
*Assistant Examiner*—Richard E. Berger
*Attorney, Agent, or Firm*—Carl W. Baker; Joseph B. Forman; Frank L. Neuhauser

[57] ABSTRACT

An intermediate frequency sidelobe canceller of the kind including a cancellation loop, with provision added for programming the correlation signal weights which control operation of the loop. This capability is provided by switch means interposed in the cancellation loop within the correlation signal branch thereof and selectively operable to break the loop and then either to substitute for the normally weighted correlation signal to the canceller another signal of different weighting, such as an externally supplied signal, or to retain or "hold" the current value of the correlation signal. Such substitution affords improved canceller operation and adaptability to otherwise difficult operating conditions such as strong clutter and transmitted pulse interference.

8 Claims, 7 Drawing Figures

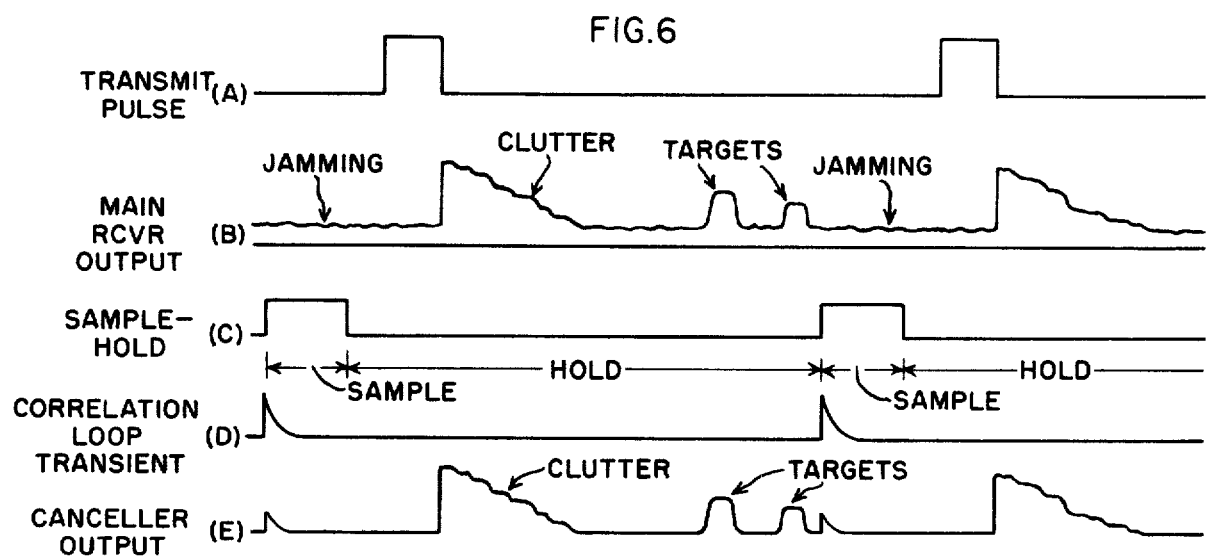
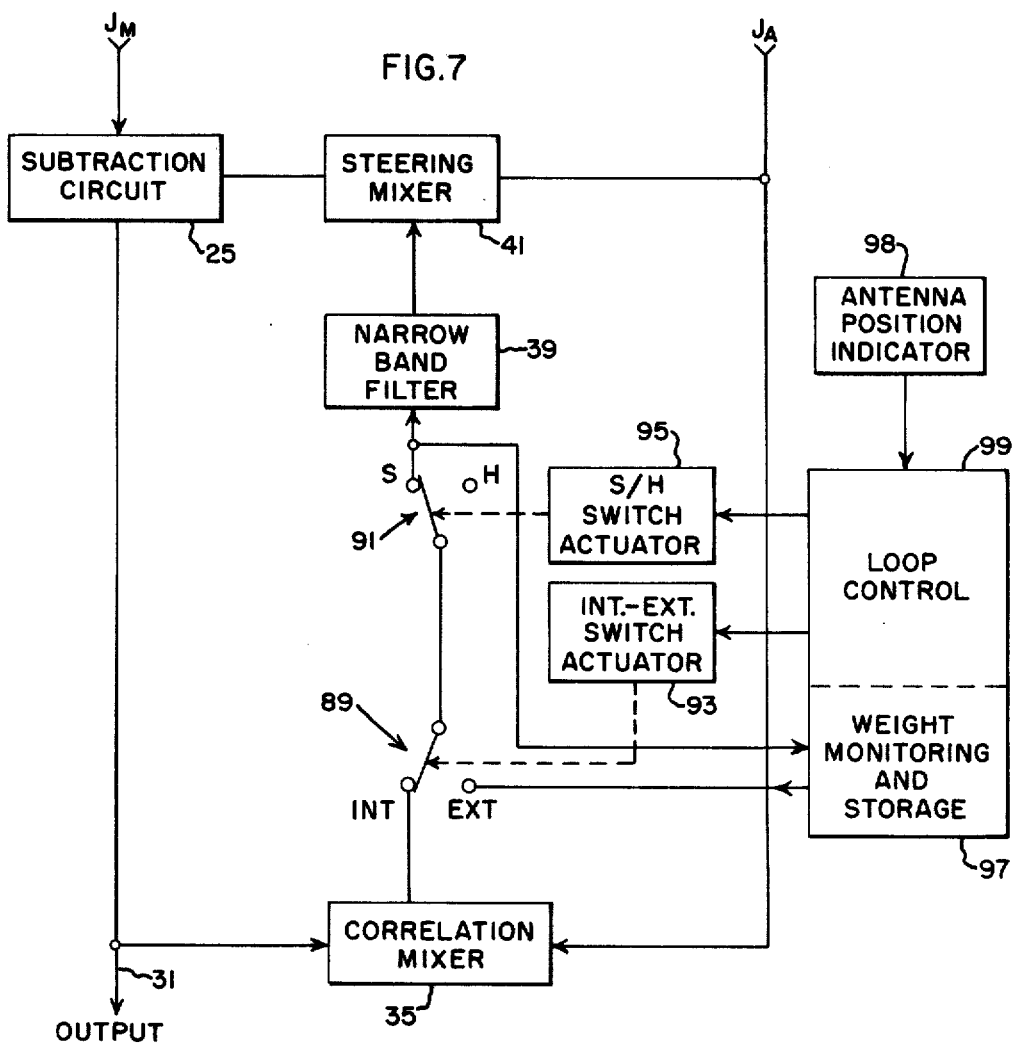

SIDELOBE CANCELLER WITH PROGRAMMABLE CORRELATION SIGNAL WEIGHTING

BACKGROUND OF THE INVENTION

This invention relates to signal processors for radar, sonar and like signal reception systems, and more particularly to sidelobe cancellation circuits for control of jamming, interference and other noise in such systems.

Still more particularly, the present invention constitutes a refinement of the basic intermediate frequency sidelobe canceller circuit disclosed and claimed in U.S. Pat. No. 3,202,990, which issued Aug. 24, 1965 to Paul W. Howells and is assigned to the assignee of the present application. The basic canceller loop of this Howells patent has proved to be effective against a variety of jamming and other interference sources, and it has been successfully and extensively used in many signal processor applications in both single loop and multiple loop versions as described in the patent. A modification of the basic multiple loop canceller is disclosed and claimed in the copending application of Kovarik, Howells and Applebaum, Ser. No. 165,259, filed Jan. 9, 1962, also of common assignment.

The provision of controllability or programmability of correlation signal weighting in accordance with the present invention affords significant enhancement of capabilities of sidelobe cancellers of the kind described in these earlier filed cases. Controllability of correlation signal weighting affords also greater adaptability and thus potentially greater applicability of such cancellers particularly in adverse operating environments such as those in which there are strong cluter returns or other returns from nearby highly reflective targets, or transmitted pulse interference due to cross-feed or leakage between the transmitter and receiver. In these situations the conventional sidelobe canceller will attempt to lock onto and cancel the clutter, large target return or transmitted pulse, and while cancellation of such interference is not objectionable in itself it serves no necessary purpose and the large transients introduced thereby into the cancellation loop may retard or introduce error into its response to the jamming signal input against which it is primarily intended to operate.

The results from the fact that in the interests of canceller selectivity and stability the time constant of the cancellation loop typically is relatively long as compared to the pulse repetition period (PRP), even spanning several PRP's in some cases. As a consequence, the canceller loop effectively reacts to an averaged value of the signal input over at least a substantial part of one pulse repetition period and sometimes over one or more complete PRP's. If over that period the input signal to the canceller loop includes, in addition to any jamming signal content, such additional or extraneous input as clutter, transmitted pulse energy or other non-jammer interference, the capability of the canceller loop to react to and cancel the jamming signal may be compromised thereby. The result of the correlation process within the canceller loop then will be to generate a correction or cancellation signal which is not precisely matched in amplitude and phase to the jammer signal alone but rather to time-averaged values of that signal plus the extraneous input, and such poorly matched correction signal will not completely cancel the interference.

While these problems can be alleviated to some extent by design for shorter loop time constants, this may as previously noted introduce other problems. Also, even if the loop time constant is made relatively very short, as for example some small fraction of the pulse repetition period, canceller operation still may be affected simply due to the presence of clutter or like signals in the loop which correlate and perturb the weights which would otherwise be optimized for cancellation of jamming.

Additionally, when operating against jamming signals the necessity for this finite loop time constant, and the finite time requirement for the proper cancellation signal to be generated to fully cancel the jamming signal, necessarily means that some small part of the jamming signal initially will get through the canceller before lock-on and complete cancellation is attained. This uncancelled signal is of such short duration and so attenuated by the canceller as usually not to be troublesome, but it may in some cases be necessary or desirable to cancel the jamming signal more completely, with little if any residue even during the lock-on period. This may be accomplished in accordance with the invention by substituting an externally supplied signal for the normal correlation signal in the canceller, with such externally supplied signal being pre-programmed to be of amplitude and phase such that the cancellation signal which will be generated within the loop in response thereto will be matched in time, amplitude and phase with the jamming signal. The jamming signal thus can be cancelled completely.

SUMMARY OF THE INVENTION

In carrying out the invention in its presently preferred embodiments, a single or multiple loop sidelobe canceller of the general configuration of Howells U.S. Pat. No. 3,202,990 has interposed in the cancellation loop, preferably at a point in the branch thereof which includes the correlation signal integration filter, switching means for breaking the cancellation loop at that point and substituting for the normally weighted correlation signal another and different correlation signal. This may be an externally supplied signal or a signal derived by "sample and hold" of the correlation signal itself, and in the latter case the time of occurrence and duration of the sampling period may be programmed for improved canceller operation in one or more different respects. By properly timing the sampling period with respect to the transmitted pulse, for example, the operation of the cancellation circuit may be made insensitive to transmitted pulse energy applied to the circuit either directly, as by cross-coupling or leakage between the transmitter and receiver, or after reflection as by clutter. In this way the canceller loop's capabilities against jamming signal input are not compromised by the loop's efforts to cancel non-jammer signal energy such as clutter, for which other remedies are available.

In another embodiment of the invention, externally supplied correlation signals may be employed to eliminate or reduce the loop transients which otherwise are necessary to enable the loop to "lock" onto and completely cancel a jamming signal, due to the finite time constant of the loop. By substituting for the normal correlation signal a preset or pre-programmed signal known to provide a cancellation signal precisely matched in amplitude and phase to a particular jamming signal, that signal may be cancelled almost completely even as of the moment of its beginning, with little if any transient. Operation in this manner assumes advance knowledge of the location and signal characteristics of the jamming signal source, which may be determined during the first scan of the antenna and placed in a memory or store for subsequent recall and application to the canceller loop when the antenna again reaches a position corresponding to that same location. Such operation also assumes relatively little and slow change of jammer location with time, as of course is often the case, but will accommodate relatively more rapid change of jammer signal characteristics as the loop acts quickly to maintain a continuing match therewith, by the cancellation signal.

BRIEF DESCRIPTION OF THE DRAWING

These and other objects, features and advantages of the invention will be further understood by reference to the following description when taken in conjunction with the accompanying drawings, wherein:

FIG. 6 illustrates waveforms exemplary of the operation of the canceller of FIG. 5; and FIG. 7 is a block diagram of a modified canceller with correlation signal weighting externally generated as a function of antenna position.

DESCRIPTION OF THE PREFERRED EMBODIMENT

Figure 1:
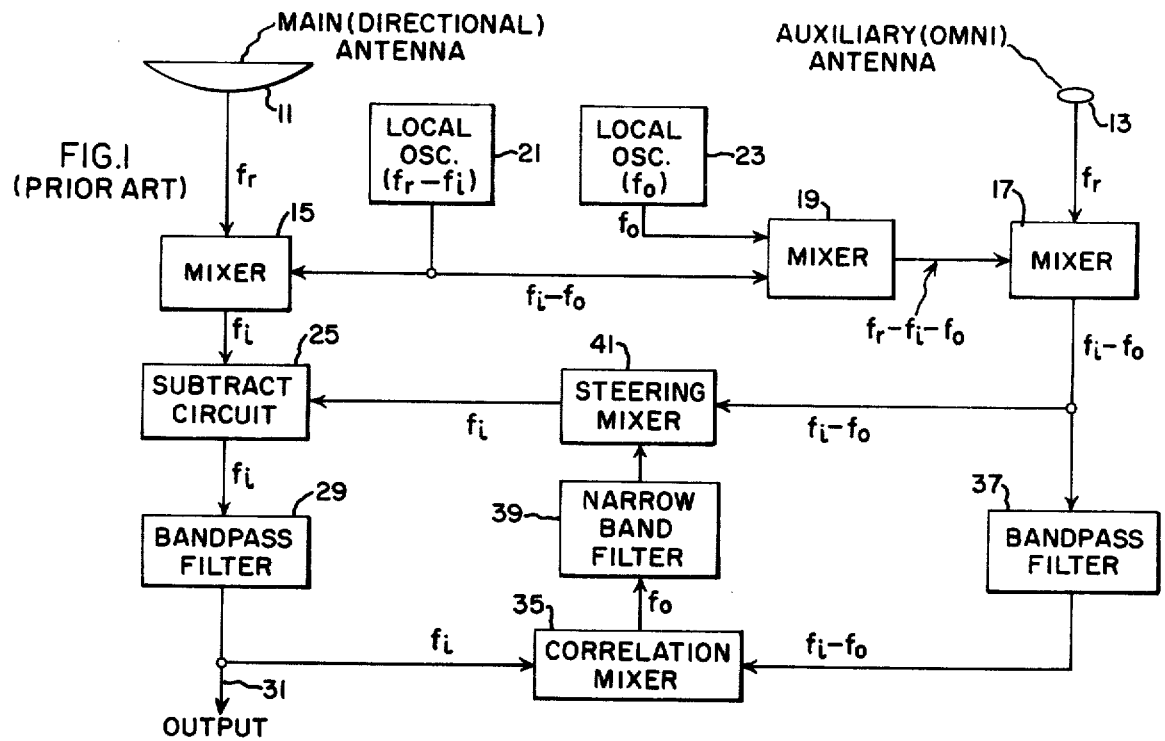
FIG. 1 is a block diagram of a prior art sidelobe cancellation circuit similar to that of the aforementioned Howells patent.

With continued reference to the drawings, FIG. 1 illustrates a sidelobe canceller circuit similar in general configuration to the aforementioned Howells — U.S. Pat. No. 3,202,990. As shown, the cancellation loop comprises main and auxiliary channels to which the respective signal inputs are provided by a directional antenna 11 and an omnidirectional antenna 13, the latter preferably being located in close proximity to the main or directional antenna. The basic function of the cancellation loop is to cancel, from the signal as received by the main antenna, any jamming signal content received through a sidelobe of that antenna. This is desirable because even though the antenna sidelobes may be many decibels down from the mainlobe, the very high power levels which are typical of jamming and other interference signals may still be troublesome when introduced through an antenna sidelobe. The power levels of desired signals, such as target reflections in the case of a radar system, often are so much lower than interference signal power levels that the higher gain of the antenna mainlobe as compared to its sidelobes is insufficient to enable detection of a mainlobe target signal masked by sidelobe interference.

To accomplish cancellation of such sidelobe interference in accordance with the Howells patent the main and omni antenna signals which are both at radio frequency ($f_r$) are reduced to intermediate frequency by first mixers 15 and 17, respectively, to which the local oscillator inputs are offset by a frequency $f_0$. This may be accomplished as illustrated by mixing, at 19, the outputs of two local oscillators 21 and 23 the latter of which introduces the desired offset frequency.

The main channel signal, which may include both mainlobe target signal content and sidelobe interference or noise signal content at the IF frequency $f_1$, is applied as one input to a subtraction circuit 25. The other input to this circuit is a correction or cancellation signal derived as hereinafter explained from the auxiliary channel signal. Circuit 25 subtracts the latter signal from the former in conventional manner. The product of this subtraction, with bandpass filtering at 29, represents the desired or target signal from which any jamming signal content has been substantially wholly cancelled, and it becomes the main channel output at 31 as indicated.

For generating the correction or cancellation signal to be applied to subtraction circuit 25, the cancellation loop comprises cross correlation means for comparing the auxiliary channel signal, in which it will be recalled the jamming signal is of relatively high power level as compared to any target or other desired signal content, and the loop output signal at 31 which contains the desired or target signal plus any residual jamming signal component not cancelled in the subtraction circuit 25. These signals are compared in a correlation mixer 35, to which the auxiliary channel signal is supplied through a bandpass filter 37.

If correspondance is found between these two signal inputs to the correlation mixer 35, as will be the case if there is any residue of the jamming signal remaining in the canceller output at 31, this will give rise to a correlation signal output from mixer 35. This signal, after narrowband filtering at 39, is applied to a steering mixer 41 which has as its second input the auxiliary channel signal and which forms part of a compensating cross-feed network providing as output the correction signal to subtraction circuit 25. In mixer 41 the auxiliary channel signal is multiplied by the correlation signal to yield this correction or cancellation signal, which is of the same frequency $f_1$ as that of the main channel signal at the point of subtraction in circuit 25. Amplifiers (not shown) may be provided as necessary at various points in the cancellation loop for purposes of maintaining desired signal levels within it.

Further detail on circuit parameters and component selection in a sidelobe canceller of the kind just described will be found in Howells — U.S. Pat. No. 3,202,990, together with an analysis of the operation of the cancellation loop in terms of mathematical relations between the signals which are provided as input to the loop and signals generated within the loop. Since these relations are complex and full description of them necessarily lengthy, reference is made to the Howells patent for such analysis and detailed description, and only the general principles of operation of the circuit will be summarized here.

In brief, sidelobe cancellers of the configuration just described function in the general manner of closed-loop servo systems wherein the error signal is constituted by any residue or uncancelled jamming signal which remains in the main channel output, the presence of such jamming signal residue being sensed by cross correlation, in mixer 35, with the jamming signal as present in the auxiliary channel input to that mixer. Whenever such error or residue is sensed, the correlation mixer output as subsequently filtered and combined with the compensating cross-feed network operates to generate a correction or cancellation signal which is of phase and amplitude such that when subtracted at 25 from the main channel signal the residue or uncancelled signal then is reduced thereby. The loop will continue to thus respond to any residual error and, after a lock-on period which is of duration determined primarily by the loop time constant and which in radar applications typically may be of the order of a few microseconds, will reduce the interference signal residue to near zero.

As described in the aforementioned Howells patent the operation of this cancellation loop is such that its gain inherently is high with respect to high average power signals, as typically is the case with jamming and other purposeful interference signals, but the gain is low with respect to low average power signals and canceller operation accordingly does not significantly degrade the performance of the radar or other system with which used, in the absence of jamming or interference. As also described in the Howells patent and the Kovarik et al. application, it is entirely feasible to extend the basic cancellation loop so as to be effective against multiple jammers by utilizing additional omni antennas and additional cancellation loops with their combined outputs and inputs respectively connected into the subtraction circuit 25 and main channel output 31 in the same manner as in the loop shown.

Figure 2:
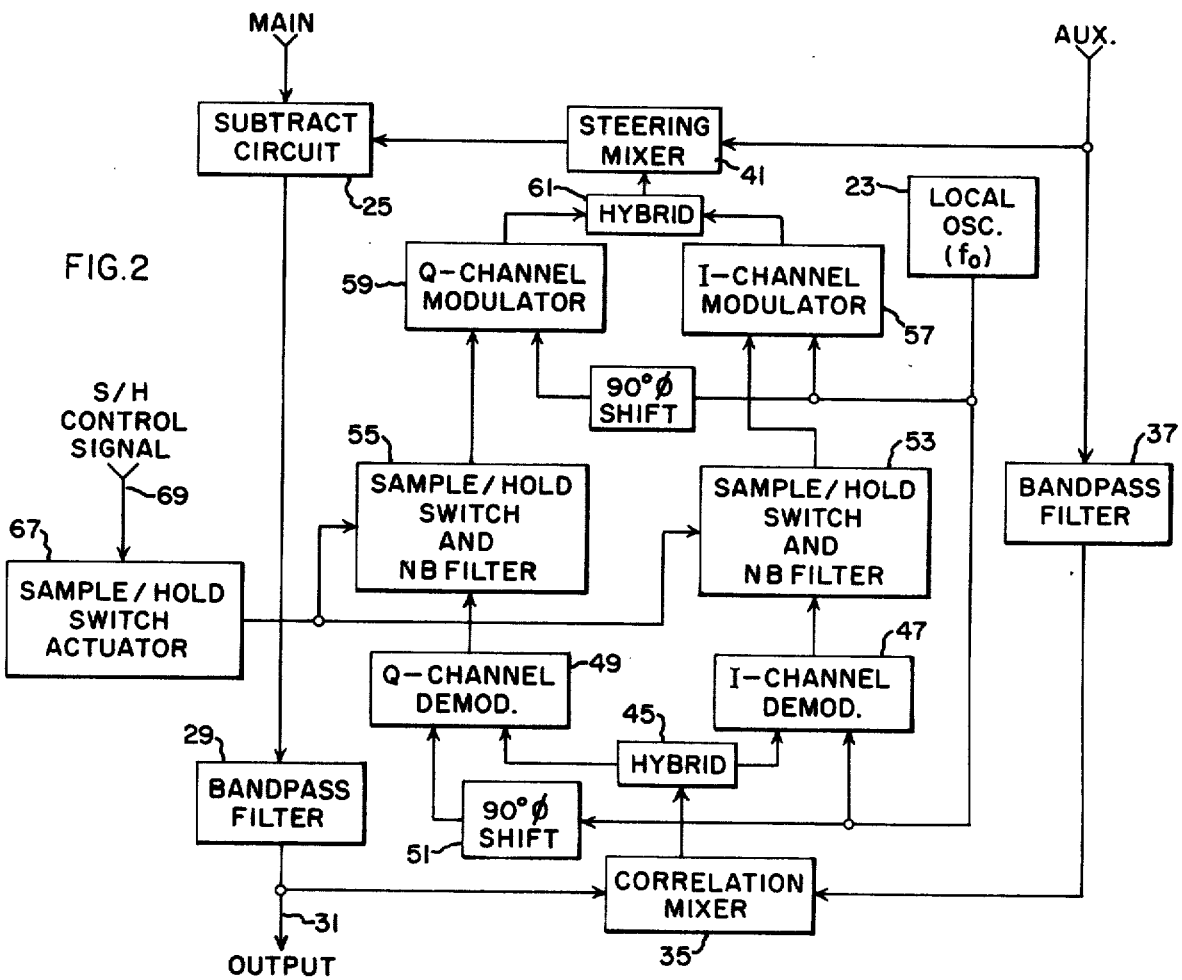
FIG. 2 is a block diagram of a cancellation circuit like that of FIG. 1 but modified to provide programmable correlation signal weighting in accordance with the invention.

In accordance with the present invention, operation of the basic sidelobe canceller circuit just described may for many applications be significantly improved by provision of a capability for programming or otherwise controlling the weightings to be given the correlation signals within the canceller loop. As illustrated in FIG. 2, this capability preferably is introduced by modification of the correlation signal branch of the cancellation loop, in which the correlation signal integrating filter is included, because the bandwidth of this integrating filter is the narrowest in the loop and control of its operation accordingly has the effect of controlling operation of the entire loop. A further advantage, where "sample and hold" operation as hereinafter explained is desired, is a possible reduction in the number of circuit elements required by employing the capacitor which normally is present here, as an element of the correlation signal integrating filter, as a signal "hold" device.

The very narrow bandwidth for the correlation signal integrating filter which is desired for optimized canceller operation is in practice most easily accomplished by demodulation of the IF signal to derive the in-phase (I) and quadrature (Q) components of the correlation signal at video frequency. The I and Q video weights thus derived then are low-pass filtered, and finally are remodulated and recombined to yield the desired IF output. Narrowband filtering in this way produces an output identical to the input within the constraints of the low-pass filter, some proportionability constant in amplitude, and a constant in-phase.

In FIG. 2, the splitting of the correlation signal output from mixer 35 into its in-phase components is accomplished in a 0° hybrid 45. These signals are then demodulated at 47 and 49, respectively, by phase detection relative to the I and Q components of a reference signal from a local oscillator 23 of frequency equal to the frequency difference ($f_o$) between the main and auxiliary channels. The necessary phase relationship between the in-phase and quadrature signal components is provided by a 90° phase shifter 51 as indicated.

The I and Q video signals are narrowband filtered at 53 and 55, respectively, and the signals then used at 57 and 59 to remodulate the reference oscillator in-phase and quadrature signals. The products of this remodulation are combined in a second 0° hybrid 61 to produce the final IF output to the steering mixer 41, for generation there of a correction signal in the same manner as hereinbefore described in reference to FIG. 1.

Figure 3:
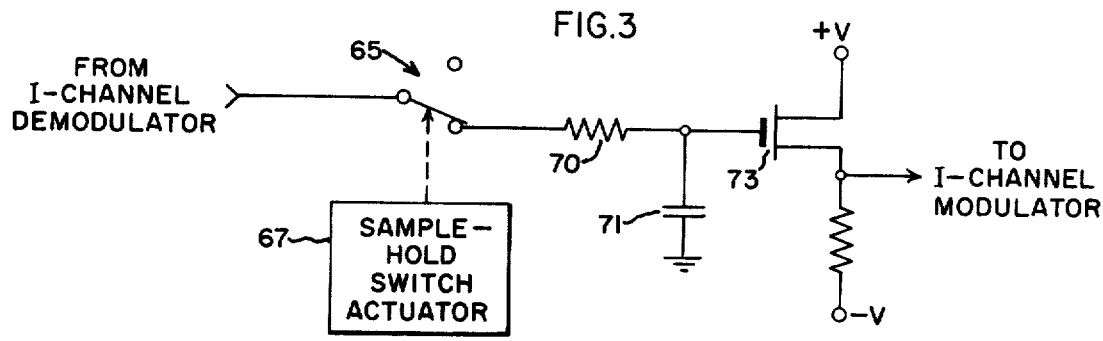
FIG. 3 is an elementary diagram of a sample/hold and narrow-band filter circuit suitable for use in the canceller of FIG. 2.

The narrowband filter elements 53–55 in FIG. 2 are combined with sample and hold switch elements the function of which is to break the I and Q channel circuits at this point and to hold whatever value of correlation signal is present there at the moment of the break. To this end, the correlation signal processors comprising switch and filter units 53 and 55 may be configured as shown in FIG. 3, in which only the I-channel circuitry is shown. The I-channel video signal input is selectively applied through a switch 65 under control of a switch actuator 67, to a low-pass filter which may be a conventional RC filter comprising resistance and capacitance elements 70 and 71, respectively. The filtered signal then is applied to the base of a field effect transistor 73 which is biased as shown for essentially zero gate current flow, and which provides the output of the filtered I-channel signal to the modulation which follows.

With the switch 65 in the "sample" position illustrated, signal flow through the circuit is in the conventional mode and processor operation is simply that of a low-pass filter. When the sample/hold switch actuator 67 is energized and the switch 65 shifted to its open or "hold" position, whatever charge exists on the capacitor 71 at that moment in time will remain there indefinitely, since the capacitor has no discharge path, and the correlation signal output to the I-channel modulator accordingly will likewise be held at this constant value. Capacitor 71 thus serves both as an element of the low-pass filter and as the memory element for the signal "hold" function as described.

Referring again to FIG. 2, it will be noted that the sample/hold switch and narrowband filters 53–55 for both the I and Q channels of the correlation signal branch of the canceller loop may operate under control of a common sample/hold switch actuator 67 in response to a sample/hold control signal input at 69. Control of operation of the sample/hold switch may as previously explained be accomplished in any of several different ways depending upon the particular mode of canceller operation desired.

Figure 4:
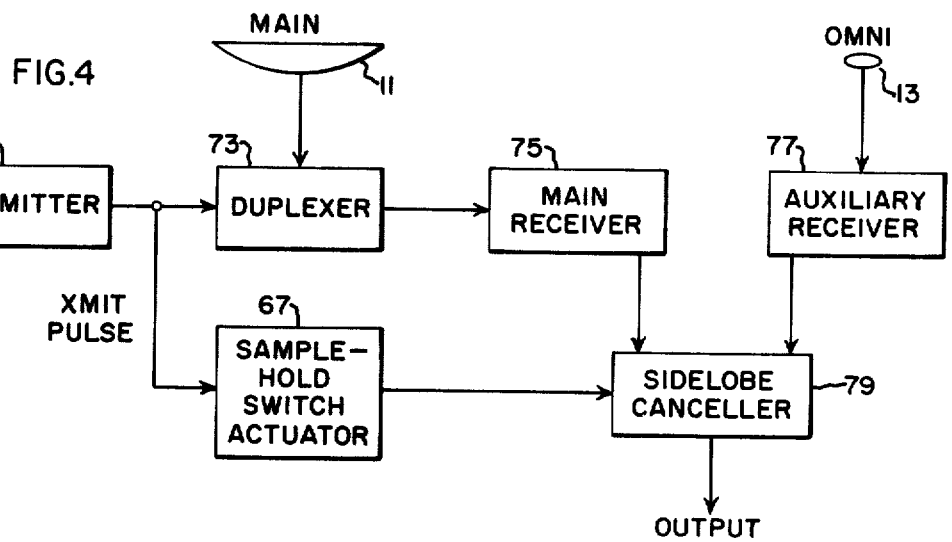
FIG. 4 is a block diagram of a first alternative embodiment of the invention.

For example, and as shown in FIG. 4, where it is desired to prevent the canceller from responding to the transmitted pulse, the sample/hold switch accuator 67 may be connected to be energized by the transmitted pulse as applied by the transmitter 71 to duplexer 73. The main receiver 75, auxiliary receiver 77 and sidelobe canceller circuit 79 in FIG. 4 may otherwise be as shown in FIG. 2. With the transmitted pulse as the control input to the sample/hold switch actuator, the canceller loop is broken at the beginning and remains open-looped through each transmitted pulse, and while the canceller thus is operating open-loop the correlation signal which it will see will continue to be the same as that signal just prior to the sample/hold switch actuation and represented by the charge held on capacitor 71 in the integration filter. At all other times during each pulse repetition period, the canceller will operate closed-loop in the normal fashion.

Figure 5:
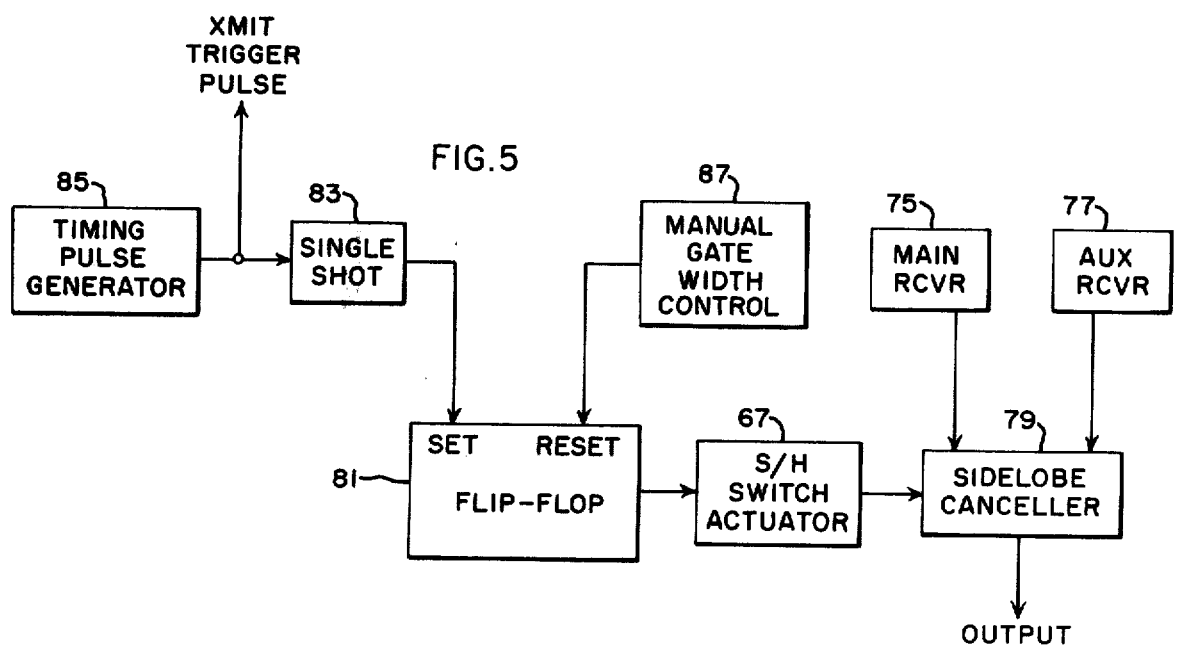
FIG. 5 is a block diagram of another such alternative embodiment.

Referring now to FIG. 5, the sample/hold switch actuator control arrangement shown here may be used to cause the canceller to operate open-loop not only during the duration of each transmitted pulse but also through a period of time following each pulse transmission through which clutter returns are concentrated and during which the clutter level may be such as to introduce error into the operation of the canceller loop if included in the signal inputs to the loop. To isolate the loop from these inputs, there is provided a flip-flop 81 to which the "set" control is from a single-shot 83 which is in turn triggered either by the transmitted pulse itself, in a manner similar to that shown in FIG. 4, or by the transmit trigger pulse from the system timing pulse generator 85 as shown in FIG. 5. The "reset" input to flip-flop 81 is from a Manual Gate Width Control 87 providing control by the operator monitoring the radar displays on which clutter appears.

The operation of this circuit may perhaps best be understood by examination of the waveforms in FIG. 6, in which the transmit pulse is shown as Waveform A, and the receiver main channel output is shown as Waveform B comprising a combination of jamming, clutter and target signal content, all of which the loop would attempt to cancel to the extent that the same signal content is common to the auxiliary channel. By sampling only through a fractional part of each pulse repetition period, and timing this sampling period so as not to include either the transmitted pulse or clutter returns, and preferably also so as not to include target returns though they generally are less troublesome, the canceller then will operate under closed loop conditions only at times when target and clutter returns are not present in the receiver and only jamming signal is. The correlation signal weights generated within the loop then will not reflect error due to any interference signal input, and since the canceller loop will be responding only to the jamming signal its capability to cancel that signal will thus be enhanced.

Waveform C illustrates a sample/hold timing cycle which is appropriate to performance in this manner, and Waveforms D and E illustrate the results. As shown in Waveform D, there still will occur some transient within the canceller loop since some finite time is necessary for it to lock onto the jamming signal at the beginning of each sample period, but the loop does not respond to clutter or target signal content and these neither affect operation of the canceller loop nor, as indicated by Waveform E, are they affected by it.

As indicated by this last waveform, the finite time which is required for the canceller loop to lock onto the jammer signal results in the presence in the canceller output of some uncancelled jamming signal which is passed during the transient period. While this generally is small in amplitude and may in fact be of negligible amplitude where the jamming signal varies in amplitude only little from one pulse repetition period to the next, the transient may be troublesome in cases in which jamming signal levels vary quite widely, as for example in the case of a radar antenna scanning through an azimuth at various points of which strong jammers are located. In such cases the uncancelled jammer signal which is passed by the loop during these transients, i.e., passed during the lock-on period, may become significant.

This transient response characteristic of canceller loop operation may be avoided by pre-set of the correlation signal weighting as shown in FIG. 7, to which reference is now made. In the canceller circuit of that Figure, the correlation signal input to the narrowband filter 39 is under control of two switches, an "Internal-External" switch 89 and a sample/hold switch 91, which operate under control of switch actuators 93 and 95, respectively. The Internal-External switch when in the position shown applies the correlation signal directly to the narrowband filter 39 in conventional manner; when switched by actuator 93 it applies the correlation signal to weight monitoring and storage means 97 to enable monitoring and modification of the correlation signal phase and amplitude weights by external computing equipment (not shown). The weights thus generated then are substituted as input to the narrowband filter 39 and the canceller loop becomes responsive to the correlation signal weighting thus substituted.

In operation of the canceller FIG. 7, the correlation loop control would be set for loop operation in the conventional manner during the first scan of the antenna (which could be either the azimuth or elevation scan, or both) except that the weights required for cancellation at each antenna position would also be switched to and stored by the monitoring and storage means 97. The canceller would cycle through its entire transient stage at each new antenna position, with the weights generated at each position being stored at 97. One the second and all subsequent scans, the stored weights for each antenna position would be reinserted into the loop through switch 89, just before the loop is allowed to go through its transient. Then assuming that the weights from the previous scan remain reasonably close to the proper weight for subsequent scans, the transient period would be shortened or even eliminated.

In order to synchronize the operation of the Internal-External switch actuator to the scanning of the beam, an antenna position indicator 98 provides a control input to the canceller loop control 99, so as to control operation of the Internal-External switch as a function of antenna position either in azimuth or elevation or both. This enables re-injection into the loop of the correlation signal weights previously generated and stored at 97 on earlier scans for each corresponding beam position on subsequent scans, thus minimizing the lock-on time required for complete cancellation when the jammer appears again at that same beam position.

In this way the phase and amplitude adjustment, i.e., the signal weighting, of the correlation signal is enabled to be preset, thereby eliminating the transient response which otherwise occurs whenever there is a large and abrupt change in jammer signal lever input into the correlation loop. This preset or programming feature also allows, if desired, the sampling and hold of phase and amplitude weights as by operation of a sample/hold switch 91 in generally the same manner as previously described in reference to FIGS. 2–5, to thus yield the same improvements in canceller operation as there explained.

What is claimed as new and desired to be secured by Letters Patent of the United States is:
1. In a canceller:
 a. a main signal transmission channel having an output terminal and an input terminal coupled to re- ceive a signal which may include both desired and undesired signal content;

b. an auxiliary signal transmission channel coupled to receive a signal including primarily said undesired signal;

c. cross correlation means connected to the output terminal of said main signal transmission channel and to said auxiliary signal transmission channel for detecting the relative amplitude and phase of said main and auxiliary channel signals and generating a correlation signal indicative of the result of such correlation;

d. correlation signal processing means including narrowband filter means and switch means connected in series relation, said switch means being selectively operable to pass the correlation signal generated by said cross correlation means;

e. a compensating cross feed network coupled to said auxiliary signal transmission channel to receive said undesired signal and to said correlation signal processing means to receive the correlation signal as processed thereby, said cross feed network being responsive to the signals coupled thereto to generate a correction signal of amplitude and phase corresponding to the undesired signal content of the main signal transmission channel; and f. means interposed between said main channel input and output terminals for subtracting said correction signal from said main channel signal thereby to reduce the undesired signal content thereof.

2. A canceller as defined in claim 1 wherein said correlation signal processing means comprises an integrating filter including a capacitance element, and wherein said switch means is interposed between said filter and said cross correlation means, whereby said switch means may be operated to cut off further correlation signal input from said cross correlation means and to hold the correlation signal then present on said capacitance element.

3. A canceller as defined in claim 2 wherein said received signal comprises a third signal in addition to said desired and undesired signals, and including switch control means operative to open said switch means through the period of said third signal.

4. In combination in a radar system including a pulse transmitter, a canceller as defined in claim 3 wherein said third signal includes the transmitted pulse and said switch control means is responsive to said pulse to open said switch means through the period thereof.

5. In combination in a radar system including a pulse transmitter, a canceller as defined in claim 3 wherein said third signal includes clutter returns and said switch control means is operative to open said switch means through the period thereof.

6. A canceller as defined in claim 1 wherein said correlation signal processing means comprises means for dividing said correlation signal into in-phase and quadrature components and passing such components separately through said narrowband filter means.

7. A canceller as defined in claim 1 further including correlation signal storage means, and wherein said switch means is selectively operable to pass either the correlation signal output of said cross correlation means or a correlation signal from said storage means.

8. In combination in a radar system including an antenna and means for scanning the beam formed thereby, a canceller as defined in claim 7 wherein said switch means is operable to select a correlation signal input from said storage means in accordance with the scan position of said antenna.

* * * * *